UNITED STATES PATENT OFFICE.

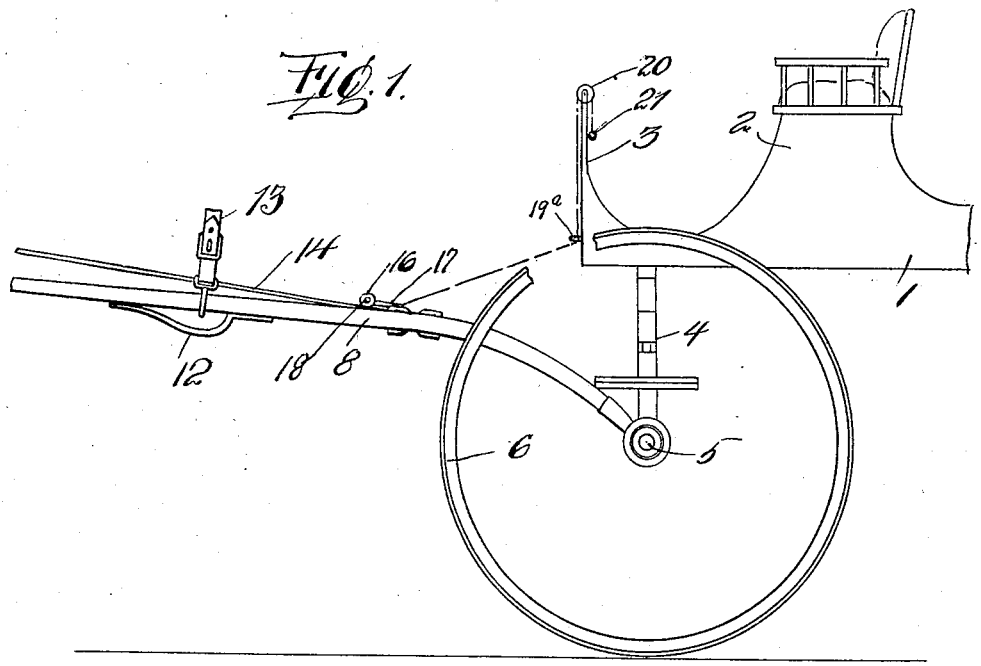
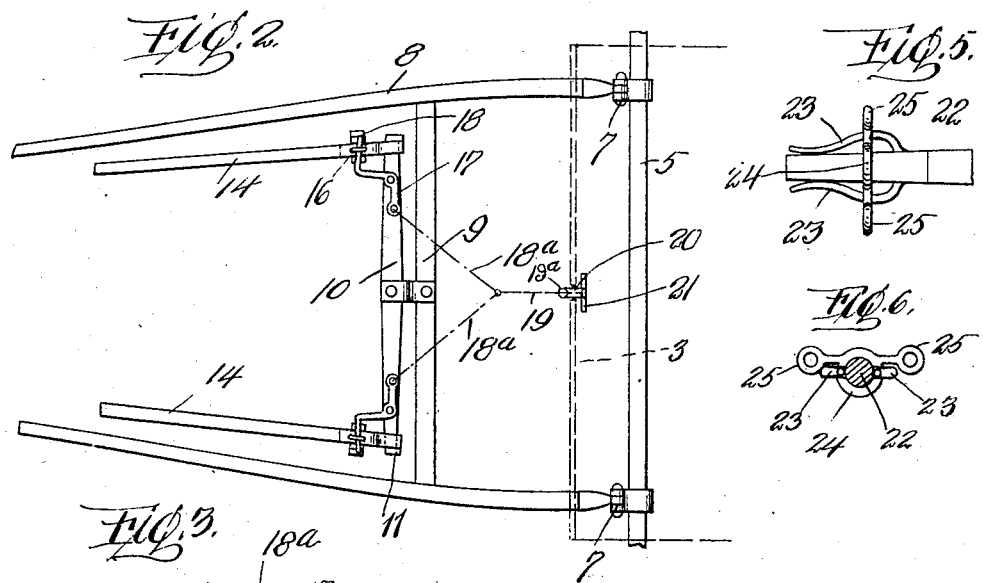

JOHN ZIMMER, OF GLENDALE, PENNSYLVANIA.

HORSE-DETACHER.

No. 904,395.   Specification of Letters Patent.   Patented Nov. 17, 1908.

Application filed August 18, 1908. Serial No. 449,109.

*To all whom it may concern:*

Be it known that I, JOHN ZIMMER, a citizen of the United States of America, residing at Glendale, in the county of Allegheny and State of Pennsylvania, have invented certain new and useful Improvements in Horse-Detachers, of which the following is a specification, reference being had therein to the accompanying drawing.

This invention relates to horse detachers, and the object of my invention is to provide simple and effective means for releasing a horse or team of horses should the same become excited and run away.

My invention aims to provide a horse detacher that can be used in connection with the present type of vehicle, without detracting from the appearance of the same, or preventing a horse or team of horses from being safely hitched to a vehicle. To this end, I have devised a horse detacher adapted to be used in connection with the swingle-tree or swingle-trees of a pair of shafts or tongue, a portion of said mechanism being carried by the dash-board of the vehicle, within easy reach of the driver, whereby a horse or team of horses can be easily and quickly released should the same become excited or a "break down" of the vehicle occur.

My invention will be presently described in detail and reference will now be had to the drawing, wherein, Figure 1 is a side elevation of a portion of the vehicle equipped with my horse detacher, Fig. 2 is a plan of a pair of shafts equipped with the horse detacher, Fig. 3 is a perspective view of the end of a swingle-tree constructed in accordance with my invention, Fig. 4 is a cross sectional view of the same, Fig. 5 is a plan of the forward end of a tongue constructed to be used with my horse detacher, and Fig. 6 is a cross sectional view of the same.

In the accompanying drawings, 1 designates the forward portion of the body of a vehicle having a driver's seat 2 and a dash board 3. This forward portion of the vehicle is supported by a spring 4 upon an axle 5, said axle having wheels 6 mounted upon the spindles thereof. Attached to the axle 5 by clips 7 is a pair of shafts 8 having a connecting bar 9 for a pivoted swingle-tree 10, the ends of said swingle-tree being enlarged, as at 11, for a purpose that will presently appear. The pair of shafts is provided with resilient clips 12 for detachably holding the backing straps 13 of the harness hitched to the vehicle. The traces 14 have the slots or eyes 15 near the hitch ends thereof, which are located at a sufficient distance from the extreme ends of the traces, to permit the hitch ends of said traces being wrapped around the swingle-tree in the manner shown in Figs. 3 and 4, so that the slots or eyes 15 will be brought in position to receive eye-bolts or keepers 16 which are carried by clamps 14$^a$ secured to the traces adjacent their rear ends. These clamps comprise upper and lower members which engage the respective faces of the traces, the upper members 17$^a$ of the clamps being hinged at one end to the lower members of said clamps, and secured at the other end by bolts 16$^a$.

To retain the hitch ends of the traces upon the eye-bolts 16, the swingle-tree is provided with pivoted bell-crank levers 17 having pins 18 adapted to extend through the eye-bolts or keepers 16. The bell-crank levers 17 are connected by branch cables 18$^a$ to a main cable 19, said cable extending upwardly through an eye-bolt 19$^a$ carried by the lower front edge of the dash-board 3. The cable extends upwardly from an eye-bolt 19$^a$ over a pulley 20 carried by the upper edge of the dash-board and is provided with a handle or weight 21 for normally maintaining the cable in engagement with said pulley. It is apparent that when the cable 19 is pulled that the pins 18 of the bell-crank levers 17 will be withdrawn from the eye-bolts 16, to allow the hitch ends of the traces to slip from the eye-bolts 16 and release a fractious or run-away horse. The backing straps 13 simply slide off the ends of the shafts.

Where my horse detacher is used in connection with a team of horses, the arrangement is the same in connection with the swingle-trees, but the forward end of the tongue 22 is provided with two resilient clips 23, a ring 24 having two eyelet extensions 25 for the collar straps or chains (not shown) of a set of harness. It is evident that when the traces or buckles of a harness are released that a team of horses can readily leave the tongue 22.

Having now described my invention what I claim as new, is:—

1. In a horse detacher, the combination with the dash-board of a vehicle body, a supporting axle thereof, and a pair of shafts attached to said axle, of resilient clips carried by said shafts for detachably holding backing straps, a swingle-tree carried by said shafts and having enlarged ends, traces adapted to detachably encircle the enlarged ends of said swingle-tree, eye-bolts mounted upon said traces, the hitch ends of said traces being provided with slots to receive said eye-bolts, pivoted bell-crank levers carried by said swingle-tree, pins carried by said bell-crank levers and adapted to extend through said eye-bolts for holding the hitch ends of said traces thereon, branch cables connecting with said bell-crank levers, a main cable connecting with said branch cables and extending upwardly over said dash-board, substantially as described.

2. In a horse detacher, the combination with a pair of shafts, and a swingle-tree carried thereby, of resilient clips carried by said shafts for holding backing straps, traces adapted to detachably encircle the ends of said swingle-tree, eye-bolts carried by said traces to engage in slots or eyes provided therefor in the hitch-ends of said traces, pivoted bell-crank levers carried by the said swingle-tree and having pins adapted to extend through said eye-bolts for holding the hitch ends of said traces thereon, and a cable connecting with said bell-crank levers for moving the pins thereof and allowing the hitch ends of said traces to slip from the eye-bolts thereof, substantially as described.

3. In a horse detacher, the combination with a pair of shafts, and a swingle-tree carried thereby, of traces adapted to detachably encircle the ends of said swingle-tree and having slots or eyes, eye-bolts carried by said traces and adapted to engage in said slots or eyes in said traces, pivoted bell-crank levers carried by said swingle-tree and having pins adapted to extend through said eye-bolts for holding the hitch ends of said traces thereon, and a cable connecting with said bell-crank levers for moving the pins thereof and allowing the hitch ends of said traces to slip from the eye-bolts thereof, substantially as described.

In testimony whereof I affix my signature in the presence of two witnesses.

JOHN ZIMMER.

Witnesses:
CHAS. KUTZNER,
JOHN A. SOSSONG.